(12) United States Patent
Bruce

(10) Patent No.: US 7,757,718 B1
(45) Date of Patent: Jul. 20, 2010

(54) POLYMER REINFORCEMENT FOR A CLAY PIPE JOINT

(76) Inventor: Mark H. Bruce, 4008 Waterford Cir., Apt. 8, Louisville, KY (US) 40207

( * ) Notice: Subject to any disclaimer, the term of this patent is extended or adjusted under 35 U.S.C. 154(b) by 203 days.

(21) Appl. No.: 11/820,534

(22) Filed: Jun. 20, 2007

(51) Int. Cl.
*B65D 59/00* (2006.01)

(52) U.S. Cl. .................. 138/96 R; 285/230; 285/45

(58) Field of Classification Search ............... 285/230, 285/290.1, 293.1, 294.2, 290.3, 290.5; 138/96 R, 138/106, 144, 175, 176
See application file for complete search history.

(56) References Cited

U.S. PATENT DOCUMENTS

| | | | | |
|---|---|---|---|---|
| 779,169 | A | * | 1/1905 | MacDonald ............. 138/175 |
| 2,383,582 | A | | 8/1945 | Barbehenn |
| 3,034,536 | A | * | 5/1962 | Kennison ............... 138/176 |
| 3,177,902 | A | * | 4/1965 | Rubenstein ............. 138/176 |
| 3,183,011 | A | * | 5/1965 | Olivier ................... 138/176 |
| 3,258,033 | A | * | 6/1966 | Ohnstad ................. 138/176 |
| 3,558,164 | A | | 1/1971 | Havell |
| RE27,061 | E | * | 2/1971 | Rubenstein ............. 138/176 |
| 3,630,237 | A | * | 12/1971 | Vernell et al. .......... 138/176 |
| 3,724,506 | A | * | 4/1973 | Crowe .................... 138/96 R |
| 3,729,939 | A | * | 5/1973 | Shimizu ................. 285/230 |
| 3,742,985 | A | * | 7/1973 | Rubenstein ............. 138/176 |
| 3,767,232 | A | * | 10/1973 | Smith ..................... 285/230 |
| 3,829,135 | A | * | 8/1974 | Forni ...................... 285/230 |
| 4,024,006 | A | | 5/1977 | Gray |
| 4,049,022 | A | * | 9/1977 | Farahar .................. 138/176 |
| 4,062,717 | A | | 12/1977 | McClean |
| 4,084,828 | A | | 4/1978 | Jones |
| 4,097,982 | A | * | 7/1978 | Pentreath et al. ........ 138/96 R |
| 4,229,028 | A | | 10/1980 | Gray |
| 4,273,599 | A | | 6/1981 | Butt |
| 4,317,693 | A | | 3/1982 | Reed |
| 4,361,336 | A | * | 11/1982 | Reeh et al. .............. 138/175 |
| 4,514,245 | A | | 4/1985 | Chabrier |
| 4,559,974 | A | * | 12/1985 | Fawley ................... 138/172 |
| 4,601,496 | A | | 7/1986 | Ulrich et al. |
| 4,676,276 | A | * | 6/1987 | Fawley ................... 138/172 |
| 4,808,032 | A | * | 2/1989 | John ....................... 138/175 |
| 4,966,494 | A | * | 10/1990 | Inagaski et al. ......... 285/230 |
| 4,980,006 | A | | 12/1990 | Bordner |
| 5,096,206 | A | * | 3/1992 | Andre et al. ............ 285/236 |
| 5,352,309 | A | | 10/1994 | Oswald |
| 5,411,619 | A | | 5/1995 | Sundqvist et al. |
| 5,785,092 | A | | 7/1998 | Friedrich et al. |
| 6,039,359 | A | * | 3/2000 | Valenziano ............. 285/230 |
| 6,336,983 | B1 | * | 1/2002 | Fawley ................... 138/99 |
| 6,629,547 | B1 | | 10/2003 | Yamaguchi et al. |
| 6,688,337 | B2 | | 2/2004 | Ward |
| 7,093,860 | B2 | * | 8/2006 | Fawley ................... 285/290.1 |

OTHER PUBLICATIONS

Internet CanClay Product Information, Denlok Jacking Pipe, 2 pages.

\* cited by examiner

*Primary Examiner*—David E Bochna
(74) *Attorney, Agent, or Firm*—Roger W. Chauza, P.C.

(57) ABSTRACT

A polymer composition including a resin and a fiberglass is wrapped around the bell portion of a clay pipe to provide a cushion thereto to resist damage due to impact forces, and holds the bell in compression to thereby increase the tensile strength thereof. The length of the bell can be lengthened using a polyester-based material for an extension, where the extension is also wrapped with the polymer composition.

22 Claims, 4 Drawing Sheets

POLYMER REINFORCEMENT FOR A CLAY PIPE JOINT

TECHNICAL FIELD OF THE INVENTION

The present invention relates in general to methods and apparatus for making pipes, and more particularly to improvements to clay pipes.

BACKGROUND OF THE INVENTION

The technologies employed in manufacturing pipes is as diverse as the types of liquids carried therethrough. Some pipes require a very high tensile strength to withstand the internal forces exerted thereon. Other pipes are required to be fabricated with special materials to resist corrosion due to the corrosive liquids and gases carried therein. Yet other pipes require optimum manufacturing efficiency to maintain the product marketable in a highly cost competitive marketplace. As can be seen, there are many constraints placed on pipe makers to compete in the diverse market place.

The manufacture of clay pipes was initiated more than a thousand years ago, and continues today. The fabrication of pipes from clay remains an on-going technology, as clay pipes are cost effective, they have a very long lifetime, exceeding a hundred years, and the base material remains plentiful. Vitrified clay pipes are a type of pipe that is formed from clay, or a mixture of clay and shale soil, and then fired at a temperature of about 2,000 degrees F. At this high temperature the clay mineral particles fuse into an inert and stable material that is durable and resists corrosion from many liquids and gasses. Some ancient cities in the Mediterranean sea area still use vitrified clay sewer pipes that were fabricated and installed over two thousand years ago.

Unlike some types of pipe material, such as ductile steel or plastic, vitrified clay pipes are more brittle and cannot be handled in a manner to expose the pipes to large impact forces, otherwise the vitrified clay material can crack or break. Insofar as many pipe systems, especially sewer systems, require a gas and liquid tight system, a crack or break in the pipe system can result in either an expensive repair or replacement of the broken pipe.

Clay pipes, like many other types of pipes adapted for use in sewer systems, include a male/female connection to mate the pipes together and form a gas and liquid seal therebetween. The male end of the pipe is often referred to as the spigot end, and the female end of the pipe is referred to as a bell. The spigot end of the pipe is inserted into the bell end to form a joint that maintains alignment of the pipes when subjected to external loads, such as settling earth or loads placed thereon due to dirt, heavy equipment, structures, roads, etc. An elastomeric seal is often placed between the spigot and bell to seal the two pipes together and prevent the escape of liquids or gasses therefrom even when pressurized, and under extreme changes in ground temperature conditions.

Clay pipes are individually handed during the many stages of manufacturing, transporting and installation. Each pipe must be moved, lifted and lowered into position a number of times between manufacture and installation. Since the bell end of the clay pipe is larger in diameter than the remainder of the pipe, it is the structure that is more subject to breakage. When a clay pipe is laid on a flat surface, such as a manufacturing plant floor, a truck bed or a open cut trench at the installation site, it is the bell end of the pipe, and the spigot end that contacts with the surface. The middle tubular part of the pipe is above the surface of the ground. The spigot end of the pipe is generally wrapped with a polyester resin or polyurethane molded casting to achieve an accurate diameter. Thus, the spigot end of the clay pipe is not as susceptible to damage from breakage. Point loading forces on the bottom of the bell can cause damage, especially if the pipe is subject to an impact, such as a short drop. In this instance, the compressive force, especially on the bell, may exceed the compressive strength of the clay material and break it. It is understood that the round shape of a clay pipe contributes, in part, to the strength of the pipe. The compressive strength of vitrified clay is relatively high, as compared to the tensile strength.

When two clay pipes are mated together, with the spigot end of one pipe inserted into the bell end of an adjacent pipe, excessive differential external loads on either pipe can cause the bell to crack or break from the resulting force exerted on the bell. If an excessive downward force is applied to the spigot end of the mated pipe, then the bottom portion of the bell of the other pipe will experience a force that may overcome the tensile strength of the bell. The bell can thus crack or break. Alternatively, if an excessive downward force is applied to the bell end of the mated pipe, then the top of the bell may experience a force that is greater than the tensile strength of the bell, and thus crack or break it. Either of these situations can occur if too much force, or an uneven compaction force, is applied to one or the other of the mated pipes during installation, backfilling, during subsequent settlement, and from live loads. The foregoing is a result of the characteristic of the relative low tensile strength of clay pipes.

Another situation is frequently encountered in which the tension force on the bell end of a clay pipe is exceeded. When the spigot end of a clay pipe, with an elastomeric seal therearound, is forced into the bell end of an adjacent pipe, the bell experiences a radial outwardly directed force. The tensile strength of the bell can be exceeded if the pipes are not accurately aligned when forced together. This situation is also exacerbated in cold weather when the elastomeric seal is less pliable and the force to mate the pipes together must be increased.

Clay pipes are manufactured by an extruding process in which wet clay is pushed into a mold having a cavity the shape of the pipe to be formed. The bell part of the mold is at a remote end of the mold, and thus it is difficult to push the wet clay back into the complex-shaped bell portion of the mold. The extruded clay is then placed in a dryer to reduce the moisture content of the molded clay prior to placing it into a kiln where it is heated to a vitrification temperature, resulting in a hardened clay pipe. Because of the inherent extruding process, it is difficult to fabricate a clay pipe with an extended or elongated bell. An axially longer bell is highly desirable, as there is more surface area for sealing with the spigot end of another pipe. With a longer bell, the spigot can slide out of the bell a certain extent and still form a seal with the inner surface of the bell. An extruded bell becomes relative less strong as it is lengthened axially.

From the foregoing, it can be seen a need exists for a pipe that has a bell with increased tensile strength. A need also exists for a pipe that has an extended bell, thus optimizing the sealing constraints with a spigot end of another pipe. Another need exists for a pipe having a bell end that is less brittle than the clay material itself, thus enabling the pipe to withstand higher impact forces.

SUMMARY OF THE INVENTION

In accordance with the principles and concepts of the invention, there is disclosed a pipe constructed of a material which includes clay or concrete. The pipe includes a bell having a fiberglass material wrapped therearound and embedded in a hardened resin. The fiberglass and resin shrinks as it hardens. The fiberglass and resin composition not only provides a cushion to the bell, but also maintains the bell under a compressive force to thereby increase the tensile strength of the bell. The bell can also be extended so as to increase the length thereof, where the extended portion is also covered with the fiberglass and resin composition.

In accordance with one embodiment of the invention, disclosed is a pipe which includes a tubular member and a bell structure attached to one end of the tubular member, where the bell structure is larger in diameter than the tubular member. The bell structure is constructed of a material having a relatively low tensile strength as compared to its compressive strength, and is characterized as being brittle. The bell structure is adapted for insertion therein of a spigot end of another pipe. An impact absorbing material is wrapped around the bell structure and has a thickness adapted to cushion the bell structure and absorb impact forces so that the bell structure is less likely to fracture.

In accordance with another embodiment of the invention, disclosed is a pipe which includes a clay tubular member and a clay bell made contemporaneously with the tubular member, where the clay bell has an annular receptacle adapted for mating with a spigot of another similar pipe. A synthetic resin material is applied around a circumference of the clay bell, and the synthetic resin material is of a type that hardens when cured. A fiberglass material is embedded within the synthetic resin material. The fiberglass embedded in the synthetic resin material functions as a cover around the clay bell to cushion the clay bell and provide protection thereto against impact damage.

In accordance with a method of the invention, disclosed are the steps of fabricating a clay pipe, including using a pipe having a bell structure formed integral therewith, where the bell structure and the pipe are each constructed of a material that includes one of a clay material or a concrete material. The bell structure of the pipe is covered with a mixture of a resin and multiple layers of a fiberglass material. The bell structure is provided with a cushion using the resin and fiberglass covering so that the bell structure is less prone to damage due to impact forces.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 4b is an enlargement of the reinforcement of the clay pipe bell of FIG. 4a.

DETAILED DESCRIPTION OF THE INVENTION

Figure 1:
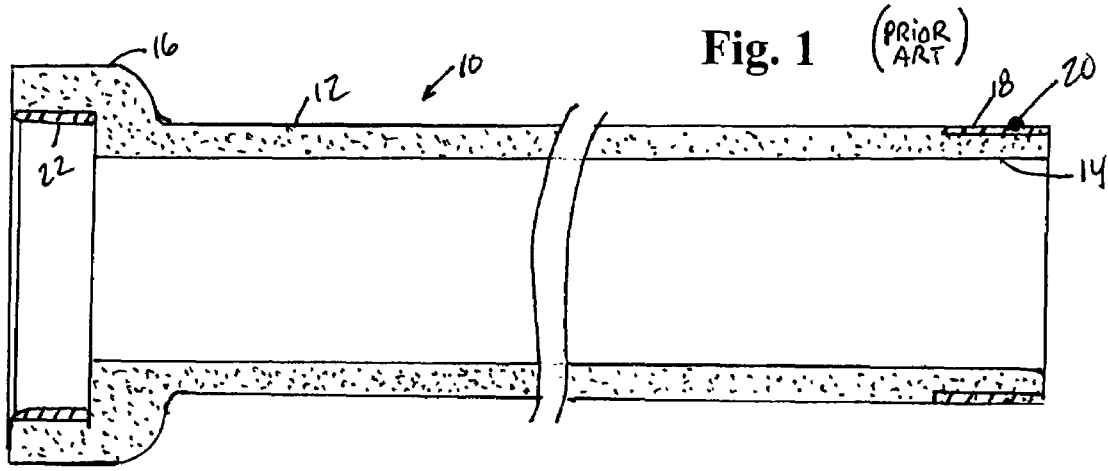
FIG. 1 is a cross-sectional view of a conventional clay pipe having a bell end and a spigot end.

With reference to FIG. 1, there is shown a clay pipe 10 of conventional construction. The clay pipe 10 includes a barrel 12, a spigot end 14 and a bell end 16. The vitreous clay is cast uniformly throughout the entire clay pipe 10. The spigot end 14 includes an annular band 18 molded of a polyurethane or a polyester and sand mixture to provide a desired annular circumference. A polyurethane molded band is elastomeric and can provide for sealing without a separate elastomeric seal member. When a polyester and sand mixture is used to achieve the desired circumference, an annular groove (not shown) is formed in the annular band 18 for holding an O-ring 20 or other type of elastomeric seal member therein. The bell 16 of the clay pipe 10 has an inner annular band 22 of either polyurethane or the polyester and sand mixture to provide a predefined inner circumference for mating with the outer surface of the spigot 14 of a similar pipe. The molding of the polyurethane or polyester and sand bands 18 and 22 is well known in the art for providing the clay pipes 10 with close tolerance ends so that when adjacent pipes are pushed or mated together, the elastomeric seal mechanism 20 is squeezed sufficiently to from a reliable air and water tight seal between the joined pipes. During manufacture of the clay pipe itself, the differential shrinkage of the clay material during drying and firing prevents very close tolerances from being obtained.

It can be seen from FIG. 1 that the bell 16 is larger in diameter than the other parts of the pipe 10 and thus is more susceptible to damage, especially impact damage if the pipe 10 is dropped, banged against each other or subject to other impact forces. The vitreous clay material is highly advantageous to provide a material that resists corrosion and deterioration over an extremely long life, but such material is relatively brittle, has a low tensile strength and thus is easily damaged when subjected to an impact or point loading force. The clay pipes in use today are available in many lengths and diameters. A large clay pipe may be ten feet long and 48 inches in diameter, and weigh as much as 7,600 pounds. The thickness of the vitreous clay of the bell may be about one inch thick at the extreme end, and the bell itself can be about three inches long in effective length on larger pipe sizes. As such, the handling of the larger clay pipes can only be accomplished by machines, and thus the pipes become more susceptible to contact with other pipes and objects, and more likely to be damaged. Insofar as the larger clay pipes are more costly, the cost of replacement or repair is also higher. Repairs of installed pipelines can be extremely expensive and disruptive to surface activities.

While the various features of the invention are described in connection with a clay pipe, the features and advantages can be employed with other pipes exhibiting brittle or low tensile strength materials, such as concrete, reinforced concrete, polymer concrete, etc.

Figure 2:
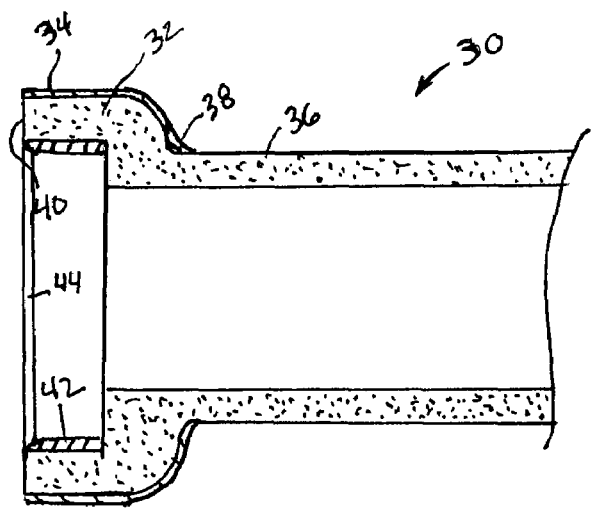
FIG. 2 is a cross-sectional view of the bell end of a clay pipe provided with a covering providing a cushion to the bell.

With reference now to FIG. 2, there is illustrated a clay pipe 30 constructed according to an important feature of the invention. Here, the clay pipe 30 includes a bell 32 that includes an annular covering 34 that makes the protruding structure of the bell 32 more resistant to impact damage. The covering 34 is a material that is not highly brittle and is adapted for cushioning the surface of the bell 32 that is otherwise exposed to damage due to impact forces. In the preferred form of the invention, the covering 34 is constructed of a fiberglass material embedded in a resin. The detailed method of applying the covering 34 to the bell end 32 of a pipe is described below. Nevertheless, the covering 34 is about one sixteenth inch to about one fourth inch thick and extends all the way around the circumference of the bell 32, and can extend onto the transition area of the bell 32, even down to the point 38 where the bell 32 joins the tubular portion 36 of the clay pipe 30. However, the extent to which the covering 34 extends down the curved transition portion of the bell 32 to the juncture point 38 can vary, depending on the application. If desired, the covering 34 can even extend down over the face edge 40 of the bell 32 to prevent impact damage thereto.

With a covering 34 provided over the exterior surface of the bell 32, the bell 32 is cushioned and resists impact forces and protects the vitreous clay from damage due to the same. The cushion provided by the covering 34 is particularly well adapted for absorbing impact loads often imparted to the pipe bells 32 during handling and movement of the pipes 30. It can be appreciated that if a clay pipe weighing about 4,000 pounds is bumped into the bell of another pipe, a significant impact force can be imparted thereto. The fiberglass and resin composition covering 34 is rugged and tough and will yield a certain extent when subjected to such an impact force, and protect the underlying vitreous clay material from point loading. In practice, it has been found that with the use of the cushion 34 covering the bell end of the clay pipe 30, fewer pipe bells have been cracked or broken during manufacture, transport and installation.

The clay pipe 30 of FIG. 2 is processed after being fired to provide a precision inside dimension (diameter) for mating with a corresponding precision outside diameter of a pipe spigot 14. To that end, the inner circumference of the bell 32 is provided with a band 42 of a material that is applied thereto and which does not undergo significant shrinkage or other change in dimension during the curing process. An annular mold (not shown) is inserted inside the bell 32. The mold is spaced from the inside surface of the bell 32 so that a polyester and sand mixture can be poured or otherwise pumped into the space. The polyester and sand mixture forms the band 42 which is of the desired diameter, irrespective of the irregular dimensions of the fired clay material of the bell 32. The formation of the band 42 in clay pipes is well known in the art. The band 42 can terminate at its opening with an entrance bevel 44 to facilitate guiding the spigot end 14 of another pipe therein.

In accordance with another feature of the invention, if the covering 34 is constructed of the proper material, it can provide a compressive force to the bell 32. A compressive force exerted around the exterior surface of the bell 32 can provides a counter force to outwardly directed forces inside the bell 32, such as when inserting a pipe spigot 14 therein. As noted above, the clay material of a bell 32 has a low tensile strength and cannot withstand substantial forces directed radially outwardly. The band 42 facilitates a minimal degree of tensile strength to the bell 32, as it is relatively thin, being about one fourth to three fourths inch thick, and cannot overcome the forces applied to the inside of a bell 32 when misaligned pipes are forced together, or when nonuniform forces are applied radially inwardly to both pipes.

When it is desired to employ a covering around the bell 32 to provide a compressive force thereto, the fiberglass should have strands that extend around the circumference of the bell 32, i.e., the strands have a longitudinal component orthogonal to the axial axis of the pipe 30. At least the fiberglass strands should be wound or otherwise laid on the bell 32 so that they have a component of tensile strength around the circumference of the bell 32. In other words, strands of fiberglass can be wound around the bell 32 in a diagonal manner so that a component of strength exists circumferentially around the pipe bell 32, rather than only axially along the pipe bell 32. Alternatively, a mixture of chopped fiberglass and resin can also be substituted for wound strands and resin to achieve an increased tensile strength capability of the bell.

In addition, the resin used in combination with the fiberglass should be of the type that contracts or shrinks when undergoing the curing process. Thus, when the fiberglass is wrapped around the bell 32 of a clay pipe 30 and embedded in the resin, the curing of the resin will cause the combination to shrink and apply a permanent compressive force around bell 32 of the pipe 30. This compressive force reinforces the bell 32 and increases its tensile strength, as well as provides a cushion to reduce the effect of external impact forces directed to the bell 32.

Figure 3:
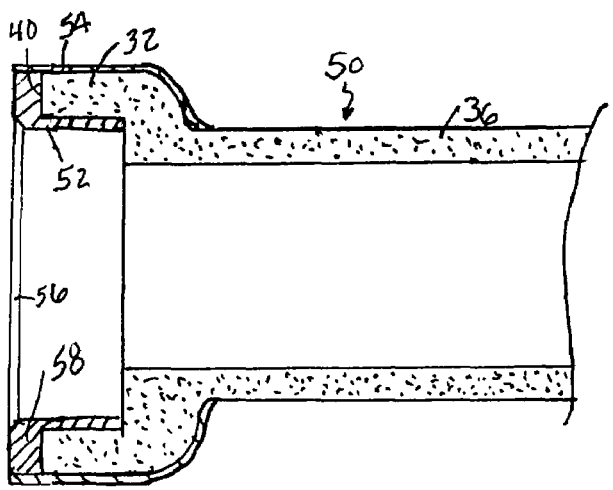
FIG. 3 is a cross-sectional view of the bell end of a clay pipe provided with an extension formed thereon.

FIG. 3 illustrates another feature of the invention in which the reinforcing cover can be extended axially outwardly to effectively lengthen the bell 32. As noted above, due to the casting process employed in making clay pipes, it is difficult to reliably mold the bell portion of the clay pipe as a long member. According to the invention, the polyester/sand band 52, or polyurethane band is extended outwardly and over the face edge 40 of the clay bell 32 by the use of a mold. The polyester/sand or polyurethane band 52 not only adheres to the inner annular circumference of the bell 32, but also to the flat face edge 40 of the bell 32. The polyester/sand or polyurethane band 52 can be trimmed or otherwise finished to include an entrance bevel 56.

The fiberglass/resin combination 54 can then be applied over the desired area of the bell 32, as well as over the extended portion 58 of the polyester/sand or polyurethane band 52. With this arrangement, the bell 32 of the clay pipe 50 is effectively extended to provide less opportunity for seal failure with the spigot end 14 of a neighbor pipe.

As noted above, in both the FIG. 2 and FIG. 3 embodiments of the invention, the fiberglass/resin cover 34 and 54 need not extend down to the point where the bell joins the tubular section of the pipe. Rather, certain circumstances may permit the fiberglass/resin cover to be applied only over the part of the bell that is characterized by the more uniform outside diameter.

Figure 4A:
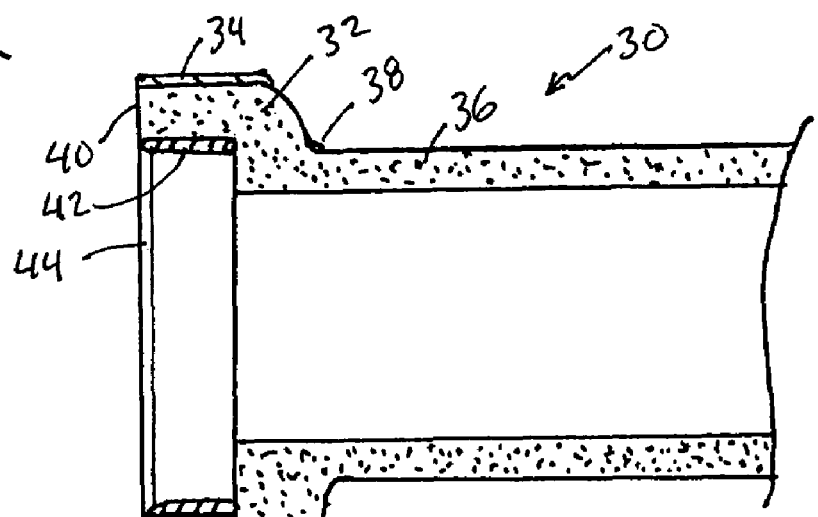
FIG. 4a is a cross-sectional view of a clay pipe with a fiberglass reinforced bell.
Figure 4B:
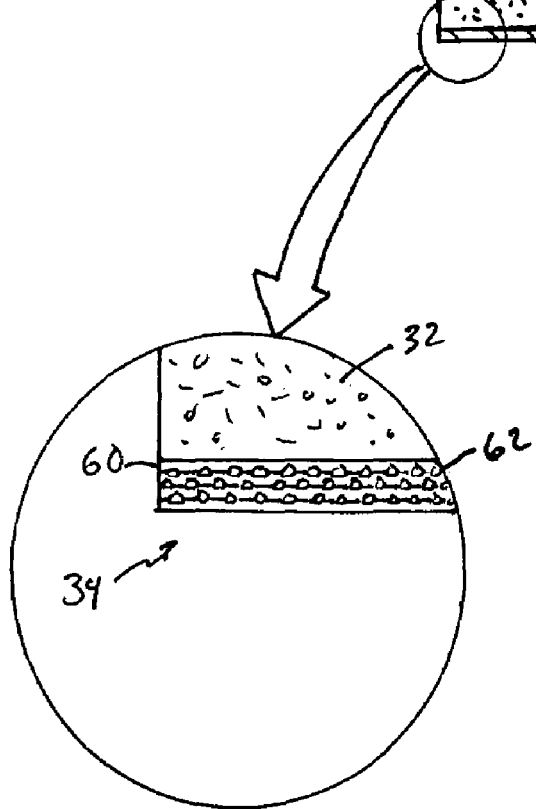

FIGS. 4a and 4b illustrate the details of the formation of the fiberglass/resin cover 34 according to an embodiment of the invention. FIG. 4a is much like the clay pipe 30 shown in FIG. 2. FIG. 4b is an enlargement illustrating the layered construction of the cover 34. The bell 32 of the clay pipe is prepared for forming the cover thereon by cleaning the exterior surface of the bell with a suitable cleaner. A conventional primer can be used to coat the surface of the clay bell to facilitate adhering of the resin thereto. In any event, a first coat 60 of a resin is applied to the surface of the prepared surface of the bell 32. The application can be by way of either spraying the resin thereon, or by brushing the resin on the surface of the bell 32. When spraying the resin on the surface of the bell 32, the clay pipe 30 can be placed on a fixture adapted for slowly rotating the clay pipe 30.

The resin can be of many conventional resins adapted for use with fiberglass. A resin well adapted for painting on the surface of the bell 32 comprises a conventional two-part resin that is mixed together and has a suitable pot life, depending on the whether applied by brush or spraying, and depending on temperature. When spraying the resin on the bell 32, the parts of the resin can be mixed at the sprayer nozzle. This type of resin is characterized by a shrinkage factor to thereby place the bell 32 under compression, as described above. If desired, other resins are available for use that do not undergo shrinkage during the curing stage.

Well within the pot life of the first layer 60 of resin layer, a first layer 62 of a fiberglass material is pressed into the resin layer 60. The fiberglass layer is preferably a mesh of conventional construction, much like that used in building or repairing boat hulls. The fiberglass mesh is a matrix of fibers running orthogonal to each other. The fiberglass mesh 62 generally becomes soaked with the resin of the first layer 60.

As an alternative, diagonal fibers of fiberglass strands or chopped fiberglass can be used instead of the fiberglass mesh.

Immediately after the first fiberglass mesh layer 62 is pressed into the resin layer 60, a second layer of resin is painted over the fiberglass mesh 62. The alternate layers of resin and fiberglass mesh are repeatedly applied over the previous layers to form a multi-layer of resin and fiberglass. In practice, the fiberglass mesh is in a roll, and the fiberglass is simply unrolled and wound around the bell 32 to form the consecutive layers. In a preferred embodiment of the invention, four layers of fiberglass are used between five respective applications or layers of resin. It should be noted, that four layers of the fiberglass mesh is not a requirement, but is believed to satisfy the cushioning necessary to reduce the impact force on the bell of a clay pipe about forty-five inches in diameter. As can be appreciated, the number of layers and the type of resin and fiberglass used can be varied to achieve the particular results desired.

Once the desired number of fiberglass layers have been applied to the surface of the bell 32, the resin is allowed to dry in a low humidity environment, at room temperature. The edges of the cured resin and fiberglass can be trimmed to eliminate any sharp points and make the pipe safer to handle. In the event that a resin is used that shrinks upon curing, the bell 32 of the pipe will be maintained in compression. If only a cushion is needed on the outer surface of the clay pipe bell 32, then a resin can be selected that does not shrink. As noted above, it has been found in practice that a fiberglass-covered bell results in a clay pipe which experiences less breakage and damage due to rough handling.

Figure 5A:
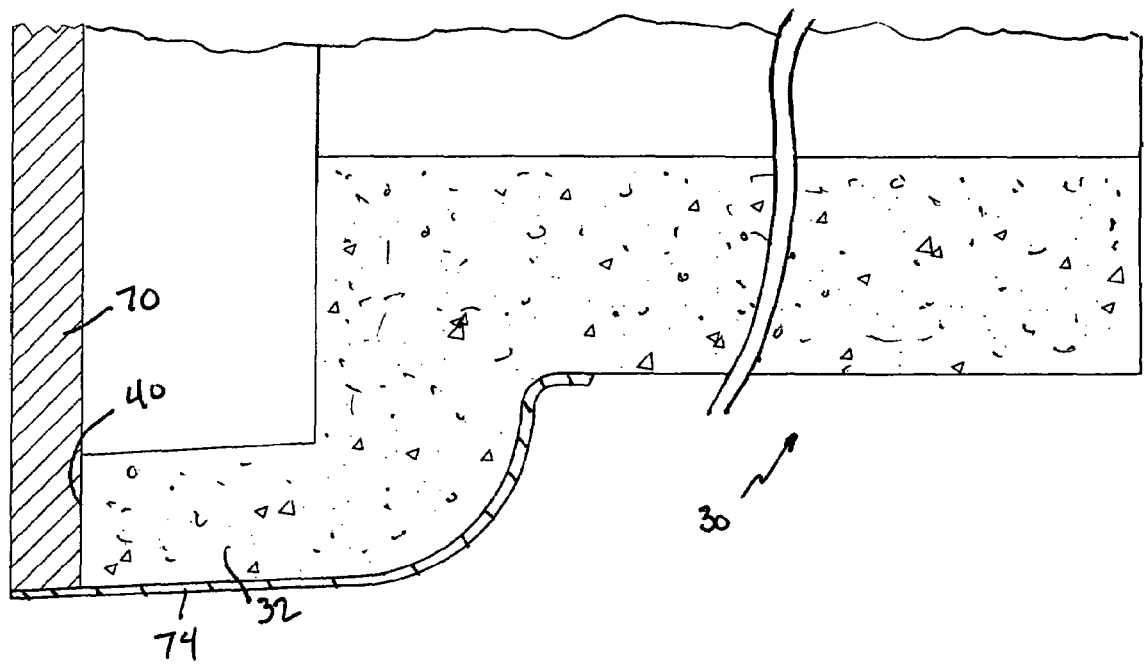
FIGS. 5a-5c illustrate the steps in fabricating a clay pipe with an extended bell.
Figure 5B:
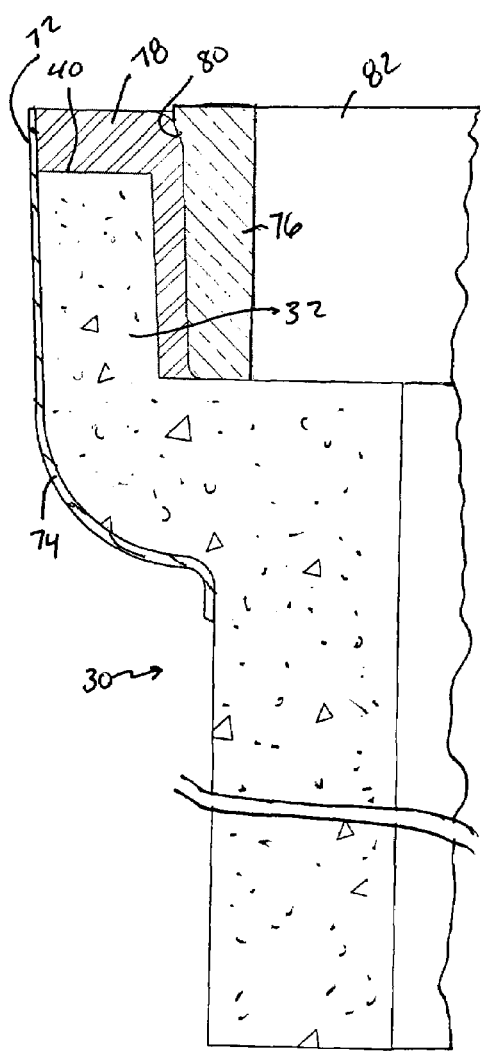
Figure 5C:
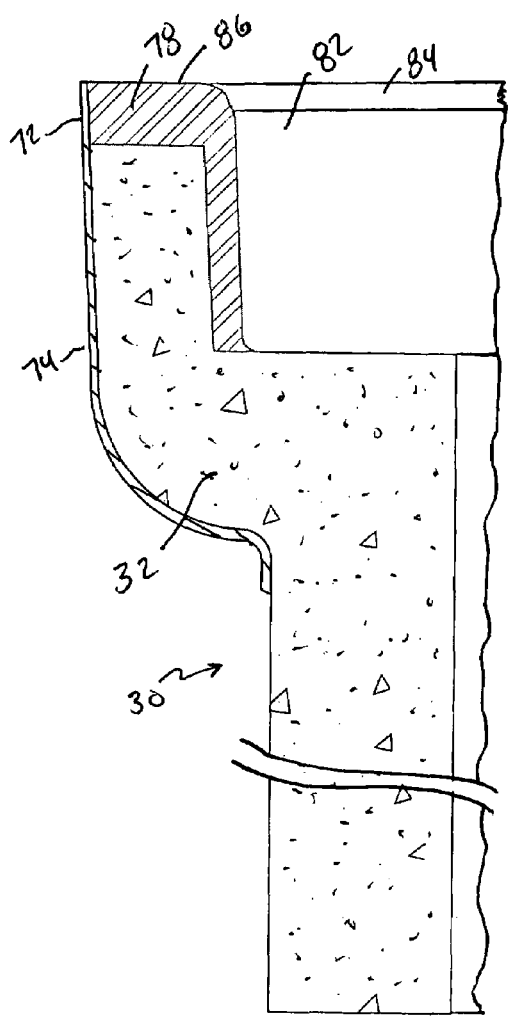

FIGS. 5a-5c illustrate the steps in fabricating an extended bell on a clay pipe according to the invention. A conventional clay pipe 30 is used as a starting point to longitudinally extend the bell and allow more area to which the seal 20 of the spigot 14 can contact to assure a reliable seal between the joined pipes. First, a circular disk-shaped mold 70 is temporarily fixed to the annular edge face 40 of the bell 32, by mechanical methods, by spot bonding with an adhesive, or the like. This is shown in FIG. 5a. The thickness of the mold 70 is selected to match the length to which the bell 32 is to be extended. If the bell 32 is to be extended by one inch, then the thickness of the mold 70 should also be at least one inch thick. Typically, the bell 32 of the clay pipe 30 is extended from about one half inch to about one and a quarter inches.

Once the mold 70 is temporarily attached to the face edge 40 of the bell 32, a release film is applied over the circumferential edge of the mold 70. Next, the layered resin and fiberglass process is carried out to encircle the bell 32. The resin component can be polyester, vinylester or epoxy. This is continued until the desired thickness of the cushion 74 is achieved. Importantly, the fiberglass and resin extends over the circumferential edge of the mold 70, as shown. The resin of the layered fiberglass 74 is allowed to completely cure until it has hardened, then the mold 70 is then removed.

FIG. 5b illustrates the subsequent process steps in forming an extension to the bell 32 of the clay pipe 30. Another mold 76 is inserted into the opening of the bell, and centered therein. The clay pipe 30 is preferably positioned with the face of the bell 32 oriented vertically, as shown in FIG. 5b. The outer surface of the mold is preferably coated with a release agent. The exterior shape of the mold 76 is an image of the interior of the surface to which the spigot 14 will mate. The outer surface of the mold 76 can include a draft angle to provide a slightly reduced diameter at the inner part of the bell 32. Also, the mold 76 can include an angled part 80 that will form an entrance bevel to the extended bell. When using polyurethane material in the molds to form the sealing material, a raised bead is often made as part of the casting to create a point of compression for the elastomeric material of the bell to seal against the surface of the spigot casting (not shown).

A polyester and silica sand mixture 78, or the polyurethane material described above, is then poured or pumped into the space between the mold 76 and the bell 32, and between the mold 76 and the fiberglass extension 74. The polyester 78 (or polyurethane) is allowed to cure. The polyester and silica sand mixture, as well as the polyurethane, are well known in the art as they conform to a mold and retains their shape throughout the curing process. Thus, by using the polyester and silica sand mixture, or the polyurethane, with a mold having the desired dimensions, the shape of the inside surface of the bell can be carefully controlled without subsequent machining or finishing by a workman. Importantly, the polyester/sand mixture 78, or polyurethane, forms a part of the extended bell, with the fiberglass 72 covering the cured polyester/sand mixture 78, or polyurethane. Once the polyester portion of the mixture 78, or the polyurethane, has substantially cured, the mold 76 is pulled from the bell 32. The resulting extended bell is illustrated in FIG. 5c. The extended bell 82 includes an entrance bevel 84 to facilitate alignment of the spigot 14 inserted therein during installation of a string of pipes. With the construction of the extended bell 82 on an existing clay pipe 30, the pipe 30 can advantageously promote a better assurance of sealing between adjacent pipes. In addition, the face edge 86 of the polyester/sand mixture 78 provides a cushion and protection to the pipe 30, and prevents chipping and breakage if the pipe end is pushed or forced against a sharp object, or vice versa.

While the preferred embodiments have been described in connection with particular materials, other materials can be employed. For example, while a clay pipe is used in the preferred embodiment, the various features of the invention can be applied with equal effectiveness to concrete pipes, polymer concrete pipes, and other pipes exhibiting a bell that is prone to breakage. While a fiberglass mesh is described as the element that increases the tensile strength of the bell, other fibers can be used that exhibit a high tensile strength. Indeed, an individual fiberglass strand can be wrapped around the bell during successive applications of a resin. In some applications, a metallic strand or wire can be used as the element embedded in a resin to increase the tensile strength of the bell. Lastly, materials other than resins can be used to bond the fiberglass or other tensile increasing member to the outer surface of the bell. As noted, it is not necessary to use a bonding material that shrinks, unless it is desired to place the bell of the pipe under compression. The clay pipe described incorporates an elastomeric seal. However, the utilization of an elastomeric type seal is independent of the need for either the cushion, the reinforcement or the bell extension.

While the preferred and other embodiments of the invention have been disclosed with reference to specific bell structures, it is to be understood that many changes in detail may be made as a matter of engineering choices without departing from the spirit and scope of the invention, as defined by the appended claims.

What is claimed is:

1. A pipe, comprising:
   a tubular member constructed of one of a clay material or a concrete material, said tubular member having a sidewall constructed of only said clay material or said concrete material and not including a metal sleeve throughout a length of said tubular member;
   a bell structure attached to one end of said tubular member, where said bell structure is larger in diameter than said tubular member, said bell structure constructed of a material having a relatively low tensile strength as compared to its compressive strength, and said bell structure is characterized as being brittle, and said bell structure adapted for insertion therein of a spigot end of another similar pipe;

an impact absorbing material wrapped around an outside circumferential surface of said bell structure and integrally attached thereto, said impact absorbing material having a thickness adapted to cushion said bell structure and absorb impact forces during shipment of said pipe so that said bell structure is less likely to fracture; and said impact absorbing material wrapped around said bell structure and not substantially along a length of said tubular member, and said impact absorbing material secured around said bell structure and not secured and sealed to the spigot end of the another pipe.

2. The pipe of claim 1, wherein said impact absorbing material is adapted for applying a compressive force to said bell structure.

3. The pipe of claim 1, wherein said impact absorbing material includes a strand of material having a high tensile strength embedded therein.

4. The pipe of claim 1, wherein said bell structure includes an annular face edge fabricated of said brittle material, and further including an extension attached to said face edge for extending a longitudinal length of said bell structure, said bell structure extension formed after said impact absorbing material is wrapped around said bell.

5. The pipe of claim 4, wherein said extension is constructed in part of a synthetic material bonded to the face edge of said bell structure.

6. The pipe of claim 5, wherein said impact absorbing material is wrapped around said extension, and is not attached to a spigot of a pipe inserted into said bell structure.

7. The pipe of claim 5, further including a molded band formed inside said bell structure for engagement therein of the spigot of another pipe, said band including a material resistant to shrinkage during curing, and said band being integral with said extension.

8. The pipe of claim 1, wherein said bell structure is constructed with a material that includes one of a clay material or a concrete material.

9. A pipe, comprising:
a clay tubular member;
a clay bell attached to said tubular member, said clay bell having an annular receptacle adapted for mating with a spigot of another similar pipe;
a synthetic resin material applied around a circumference of said clay bell, said synthetic resin material of a type that hardens when cured;
a fiberglass material embedded within said synthetic resin material;
said fiberglass material embedded in said synthetic resin material comprising a cover around said clay bell to cushion said clay bell and provide protection thereto against impact damage, and said cover formed around said clay bell and not substantially along a length of said clay tubular member; and
an extension formed on an annular face edge of said clay bell to extend a length of said clay bell, said extension formed of a material different from said clay bell, and said extension including an annular entrance bevel to facilitate insertion of the spigot of the similar pipe therein, and said cover extending over said extension but not contacting the mated spigot of the similar pipe.

10. The pipe of claim 9, wherein said clay bell includes a transition portion joining said clay bell with said clay tubular member, wherein said synthetic resin material embedded fiberglass extends from said face edge and onto said transition portion.

11. The pipe of claim 9, wherein said synthetic resin material is adapted for shrinkage during curing to thereby place said clay bell in compression.

12. The pipe of claim 9, wherein said fiberglass material comprises a fiberglass mesh, and multiple layers of said fiberglass mesh are wrapped around said clay bell.

13. The pipe of claim 9, wherein said fiberglass material extends axially outwardly beyond a face edge of said clay bell.

14. A method of fabricating a pipe of a type having a bell structure, comprising:
using a tubular pipe having a bell structure formed integral therewith, where said bell structure and said tubular pipe are each constructed of a material that includes one of a clay material or a concrete material, where the pipe has a sidewall uniformly constructed of said clay material or concrete material therethrough from an inside surface of said tubular pipe to an outside surfaced of said tubular pipe;
covering the bell structure of the pipe with mixture of a resin and at least one layer of a fiberglass material to provide said bell structure with a cushion using said resin and fiberglass covering so that said bell structure is less prone to damage due to impact forces; and
preventing a substantial length of said tubular pipe from being covered with said fiberglass layer.

15. The method of claim 14, further including using said resin and fiberglass covering to provide a compressive force to said bell structure to increase a tensile strength of said bell structure.

16. The method of claim 14, further including using said resin and fiberglass covering to extend an axial length of said bell structure.

17. The method of claim 14, further including:
forming an annular extension on said bell to effectively extend an axial length of said bell;
covering the annular bell extension with said resin and fiberglass material; and
forming an entrance bevel in said annular bell extension to facilitate insertion of a spigot end of a similar pipe into said annular bell extension.

18. A pipe, comprising:
a tubular member constructed of one of a clay material or a concrete material, said tubular member having a sidewall constructed of only said clay material or said concrete material and not including a metal sleeve throughout a length of said tubular member;
a bell structure attached to one end of said tubular member, where said bell structure is larger in diameter than said tubular member, said bell structure constructed of a material having a relatively low tensile strength as compared to its compressive strength, and said bell structure is characterized as being brittle, and said bell structure adapted for insertion therein of a spigot end of another similar pipe;
an impact absorbing material comprises a fiberglass material embedded in a resin;

said impact absorbing material wrapped around an outside circumferential surface of said bell structure and integrally attached thereto, said impact absorbing material having a thickness adapted to cushion said bell structure and absorb impact forces so that said bell structure is less likely to fracture; and said impact absorbing material wrapped around said bell structure and not substantially along a length of said tubular member.

19. The pipe of claim 18, wherein said fiberglass material comprises a mesh.

20. The pipe of claim 19, wherein said fiberglass mesh encircles said bell structure a plurality of times.

21. The pipe of claim 20, wherein said fiberglass mesh comprises an elongate strip of a fiberglass mesh wrapped around said bell structure a plurality of times.

22. The pipe of claim 19, wherein said fiberglass mesh includes fiberglass strands extending generally orthogonal to each other, with multiple layers of said fiberglass mesh wrapped around said bell structure, where the fiberglass strands of one layer are generally parallel to the corresponding strands of a neighbor layer of the fiberglass mesh.

* * * * *